(12) United States Patent
Ebner et al.

(10) Patent No.: US 8,893,861 B2
(45) Date of Patent: Nov. 25, 2014

(54) PARKING BRAKE DEVICE OF A RAILWAY VEHICLE HAVING HIGH EFFICIENCY

(75) Inventors: Christian Ebner, Augsburg (DE); Michael Mathieu, Puchheim (DE); Erich Fuderer, Fürstenfeldbruck (DE); Harry-Werner Kraus, Munich (DE)

(73) Assignee: Knorr-Bremse Systeme fur Schienenfahrzeuge GmbH, Munich (DE)

( * ) Notice: Subject to any disclaimer, the term of this patent is extended or adjusted under 35 U.S.C. 154(b) by 131 days.

(21) Appl. No.: 13/266,521

(22) PCT Filed: Apr. 28, 2010

(86) PCT No.: PCT/EP2010/002593
§ 371 (c)(1), (2), (4) Date: Oct. 27, 2011

(87) PCT Pub. No.: WO2010/127791
PCT Pub. Date: Nov. 11, 2010

(65) Prior Publication Data
US 2012/0043169 A1    Feb. 23, 2012

(30) Foreign Application Priority Data
May 8, 2009  (DE) .......................... 10 2009 020 548

(51) Int. Cl.
*F16D 55/08* (2006.01)
*B60T 17/08* (2006.01)
(Continued)

(52) U.S. Cl.
CPC ........... *B60T 17/081* (2013.01); *F16D 2121/02* (2013.01); *F16D 2121/14* (2013.01);
(Continued)

(58) Field of Classification Search
CPC ... B60T 17/081; F16D 2121/14; F16D 65/18; F16D 2125/28; F16D 2127/007; F16D 2127/06; F16D 55/08

USPC ............ 188/72.6, 71.1, 72.1, 72.7, 72.9, 265
See application file for complete search history.

(56) References Cited

U.S. PATENT DOCUMENTS 3,386,534 A * 6/1968 Press ........................... 188/71.9
3,995,537 A   12/1976 Severinsson
(Continued)

FOREIGN PATENT DOCUMENTS

DE  2513870 A1  10/1975
DE  2659768 A1   7/1978
(Continued)

OTHER PUBLICATIONS

Search Report for International Patent Application No. PCT/EP2010/002593; Nov. 22, 2010.

*Primary Examiner* — Robert A Siconolfi
*Assistant Examiner* — Charles Poon
(74) *Attorney, Agent, or Firm* — Barnes & Thorburg LLP

(57) ABSTRACT

A brake device of a railway vehicle, having at least one operating brake cylinder having at least one operating brake piston actuated by a pressurizing medium, the piston actuating an operating brake piston rod coaxial to the brake cylinder axis, and having a parking brake device having a pivotally supported actuating lever, the rotary motion thereof being transmitted to a shaft rotationally supported by at least one shaft bearing on a housing, wherein the rotary motion of the shaft induced by the actuating lever can be converted to a linear motion parallel to the brake cylinder axis of at least one support roller rotationally supported by a support roller bearing on a rotary axis disposed parallel to the shaft, in that at least one cam having an operating cam face and rotationally fixed to the shaft is provided, the cam interacting with a radially outer support roller surface of the support roller during a tightening or releasing stroke of the parking brake device, wherein the linear motion of the support roller is transferred to the operating brake piston rod.

12 Claims, 6 Drawing Sheets

(51) Int. Cl.
  *F16D 121/02* (2012.01)
  *F16D 121/14* (2012.01)
  *F16D 123/00* (2012.01)
  *F16D 125/28* (2012.01)
  *F16D 127/00* (2012.01)
  *F16D 127/06* (2012.01)

(52) U.S. Cl.
  CPC ......... *F16D 2123/00* (2013.01); *F16D 2125/28* (2013.01); *F16D 2127/007* (2013.01); *F16D 2127/06* (2013.01)
  USPC ........................................ 188/72.7; 188/72.6

(56) References Cited

U.S. PATENT DOCUMENTS

| | | | |
|---|---|---|---|
| 4,467,704 A | | 8/1984 | Casalone |
| 4,716,995 A | * | 1/1988 | Nilsson et al. ................ 188/197 |
| 5,433,298 A | * | 7/1995 | Antony et al. ................ 188/72.7 |
| 5,622,240 A | * | 4/1997 | Hartl ............................ 188/72.6 |
| 5,697,474 A | * | 12/1997 | Antony et al. ................ 188/72.6 |
| 5,833,035 A | * | 11/1998 | Severinsson ................. 188/72.7 |
| 8,006,816 B2 | * | 8/2011 | Kraus et al. .................... 188/170 |
| 2004/0168867 A1 | * | 9/2004 | Kerscher et al. ............. 188/72.6 |
| 2006/0054431 A1 | * | 3/2006 | Gilles et al. .................... 188/265 |
| 2007/0278053 A1 | * | 12/2007 | Hsieh ............................ 188/161 |
| 2010/0294601 A1 | * | 11/2010 | Kraus et al. ................... 188/72.2 |
| 2010/0307873 A1 | * | 12/2010 | Kraus et al. ................... 188/72.2 |

FOREIGN PATENT DOCUMENTS

| | | | | |
|---|---|---|---|---|
| DE | 2730959 A1 | | 1/1979 | |
| DE | 4217983 A1 | | 1/1993 | |
| DE | 10242397 B3 | | 3/2004 | |
| DE | 102005058209 A1 | | 7/2006 | |
| EP | 0081467 A1 | | 6/1983 | |
| EP | 185208 A1 | * | 6/1986 | ............. B60T 17/08 |
| EP | 260934 A1 | * | 3/1988 | ............. F16D 65/16 |
| EP | 0674116 A2 | | 9/1995 | |
| EP | 0674116 B1 | * | 9/1995 | ............. F16D 65/14 |
| GB | 2421061 A | * | 6/2006 | |
| WO | WO 9428331 A1 | * | 12/1994 | ............. F16D 65/56 |

* cited by examiner

US 8,893,861 B2

PARKING BRAKE DEVICE OF A RAILWAY VEHICLE HAVING HIGH EFFICIENCY

PRIORITY CLAIM

This patent application is a U.S. National Phase of International Patent Application No. PCT/EP2010/002593, filed 28 Apr. 2010, which claims priority to German Patent Application No. 10 2009 020 548.9, filed 8 May 2009, the disclosures of which are incorporated herein by reference in their entirety.

FIELD AND BACKGROUND OF THE INVENTION

The disclosed embodiments relate to a brake device for a railway vehicle that includes at least one service brake cylinder having at least one service brake piston actuated by a pressurized medium.

Conventionally, a brake device of the type in question is known from EP 0 674 116 B1. It is provided with a parking brake device comprising symmetrical cam actuation, in which cams having an involute contour arranged on a shaft are in engagement on both sides of a piston rod tube with rollers that are mounted on the piston rod tube in such a way as to be rotatable about a common rotational axis. Since a parking brake device of this kind has to produce large parking brake forces owing to the comparatively high weight of railway vehicles, a parking brake device of high efficiency with minimum frictional forces is desired.

SUMMARY

It is therefore the object of the disclosed embodiments to develop a brake device of the type mentioned at the outset in such a way that it has as high an efficiency as possible.

Thus, the disclosed embodiments relate to a brake device for a railway vehicle that includes at least one service brake cylinder having at least one service brake piston actuated by a pressurized medium. The piston actuates a service brake piston rod coaxial with a brake cylinder axis, and has a parking brake device with a pivotably mounted actuating lever. The rotary motion can be transmitted to a shaft arranged perpendicularly to the brake cylinder axis and rotatably mounted on a housing by means of at least one shaft bearing. The rotary motion of the shaft may be induced by means of the actuating lever can be converted to a linear motion, directed parallel to the brake cylinder axis, of at least one support roller rotatably mounted, by means of a support roller bearing, on a rotational axis arranged parallel to the shaft, by virtue of the fact that at least one cam connected to the shaft for conjoint rotation therewith and having an effective cam surface provided. The cam surface interacts with a radially outer support roller surface of the support roller during an application or release stroke of the parking brake device. Accordingly, the linear motion of the support roller may be transmitted to the service brake piston rod.

BRIEF DESCRIPTION OF THE FIGURES

Illustrative embodiments are shown in the drawings and explained in greater detail in the following description. In the drawings.

DETAILED DESCRIPTION

Figure 1:
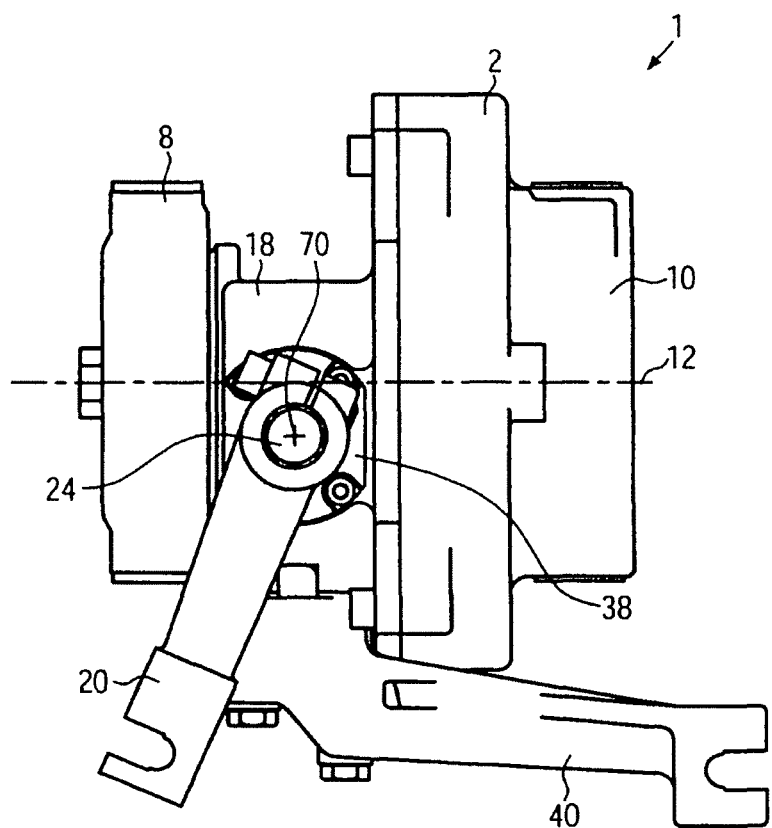
FIG. 1 shows a side view of a combined service and parking brake cylinder of a brake device for a railway vehicle in accordance with one disclosed embodiment.

The disclosed embodiments propose that the effective cam surface be designed as a circumferential segment of a cylindrical surface, the center axis of which follows a circular path of motion about the shaft axis of the shaft during an application or release stroke of the parking brake device, wherein a point of intersection of said path of motion with the brake cylinder axis exists that is associated substantially with a maximum parking brake force.

Owing to the geometrical relationships, especially those between the effective cam surface and the outer support roller surface, the profile of the parking brake force is at a maximum at a certain point or in a certain range during an application or release stroke of the parking brake device. If, at this point or in this range of maximum parking brake force, there is no lever arm between the abovementioned path of motion and the brake cylinder axis and/or the service brake piston rod coaxial therewith, no transverse forces are introduced into the service brake piston rod transmitting the brake application forces, resulting in low frictional forces and hence a high efficiency of the parking brake device. It is namely precisely in the range of the application or release stroke of the parking brake device in which the maximum parking brake force occurs that the frictional forces resulting from transverse forces are likewise at a maximum.

The term "application stroke" is intended to refer to the distance or angle which components of the parking brake device traverse, starting from a released brake home position, in which the brake pads are spaced apart from a friction partner such as a brake disk by the release clearance, to an applied position, in which the parking brake force is at a maximum.

Correspondingly, the term "release stroke" is intended to refer to the distance or angle which components of the parking brake device traverse, starting from the applied position, in which the parking brake force is at a maximum, to the released brake home position, in which the brake pads are spaced apart from a friction partner such as a brake disk by the release clearance.

The utility of developments and improvements of the disclosed embodiments indicated in the independent claims are possible by means of the measures presented in the subclaims.

In one disclosed embodiment, the shaft and the at least one support roller are arranged in such a way that the distance between a line of action of force and the shaft axis, said line of action extending between a line of contact between the effective cam surface and the support roller surface, on the one hand, and the support roller axis, on the other hand, assumes a maximum value at the beginning of the application stroke, relative to the total application stroke. The larger this distance between the line of action of force and the shaft axis, the smaller is the transmission ratio of the cam mechanism obtained through the interaction of the effective cam surface and the support roller surface.

In other words, the transmission ratio is smallest at the beginning of the application stroke when only the release clearance between the brake pads and the associated friction partner has to be crossed. The transmission ratio then increases as the application stroke progresses because the distance between the line of action of force and the shaft axis decreases. This characteristic has the advantage that the multiplication of force by the cam mechanism formed by the effective cam surface and the support roller surface then increases as the application stroke progresses, thus best satisfying requirements according to which only the release clearance has to be crossed at the beginning of the application stroke, with a small application force, and a high application force is required toward the end of the application stroke in order to achieve a maximum parking brake force.

According to a development, two cams, which are arranged symmetrically with respect to the cylinder axis and connected to the shaft for conjoint rotation therewith, and two support rollers, which interact with the cams and are arranged symmetrically with respect to the cylinder axis, are provided. Moreover, at least two shaft bearings arranged symmetrically with respect to the cylinder axis are provided, and the shaft bearings and the support roller bearings are arranged offset with respect to one another, when viewed in a direction perpendicular to the brake cylinder axis.

Given the underlying situation that the shaft bearings and the support roller bearings each occupy a certain radial installation space, this has the advantage that the shaft bearings and the support roller bearings then lie in different planes and hence that, compared with a solution in which they lie in a common plane, the shaft axis and the support roller axis can be at a shorter distance from one another, resulting in an advantageously small overall size of the brake device. This is advantageous especially in view of the limited installation space for brake devices in the area of railway vehicle trucks. The distance between the shaft bearings and the brake cylinder axis is greater than the distance between the support roller bearings and the brake cylinder axis, for example.

In another disclosed embodiment, the at least one support roller is rotatably mounted by means of a bearing journal on a pressure ring mounted on the service brake piston rod in such a way that it can be moved coaxially with respect to the brake cylinder axis, wherein the linear motion of the pressure ring is transmitted to the service brake piston rod. In particular, the linear motion of the pressure ring is transmitted via an axial stop to the service brake piston rod, which actuates a brake mechanism, such as a brake caliper unit.

The shaft is deformed elastically under load, with the result that the cams undergo an angular offset which would lead to nonuniform loading of the support rollers. In one disclosed embodiment, therefore, the pressure ring is mounted on the service brake piston rod in such a way that it can be moved coaxially with respect to the brake cylinder axis, and the stop is designed as a stop surface which is of convexly spherical design, when viewed in the direction of the brake cylinder axis, and interacts with an annular surface arranged perpendicularly to the brake cylinder axis, wherein the stop surface of convexly spherical design and the annular surface arranged perpendicularly to the brake cylinder axis are each formed either on the pressure ring or on the service brake piston rod. As a result, it is possible to compensate the angular offset of the cams since the pressure ring, which is mounted with axial play on the service brake piston rod for example, can then tilt relative to the service brake piston rod and to the brake cylinder axis. Contact between the annular surface and the stop surface of convexly spherical design then takes place, for example, substantially along at least a line, which then forms a tilt bearing for the pressure ring.

According to a development, the housing supporting at least one shaft bearing is designed as a cylinder cover, which axially closes off a spring chamber of the service brake cylinder, in which a return spring supported at one end on the cylinder cover and at the other end on the service brake piston is accommodated. The cylinder cover thus has a dual function since, on the one hand, it allows components such as the service brake piston, the return spring etc. to be mounted within the brake cylinder when it is removed from the brake cylinder and, on the other hand, it provides rotary support for at least the shaft of the parking brake device.

In this arrangement, the at least one shaft bearing is, for example, formed in a bearing cap, which can be inserted from the outside into a through opening in the cylinder cover. A bearing for a Bowden control used to actuate the actuating lever can furthermore also be formed on the cylinder cover.

More precise details will become clear in the context of the following disclosed embodiments.

The combined service and parking brake cylinder 1 shown in FIG. 1 is part of a brake device for a railway vehicle and, by way of example, actuates a brake caliper (not shown here) having two brake caliper levers (not visible here), which extend substantially parallel to one another. At one end, each of the two brake caliper levers carries a brake pad, attached by means of bolts, which can optionally engage frictionally on a brake disk.

Situated between the other ends of the brake caliper levers is the combined service and parking brake cylinder 1, the housing 2 of which is connected on the right hand side in FIG. 1 to one brake caliper lever and the service brake piston 4 of which is connected by a service brake piston rod 6 and a spindle yoke 8 to the other brake caliper lever.

Figure 3:
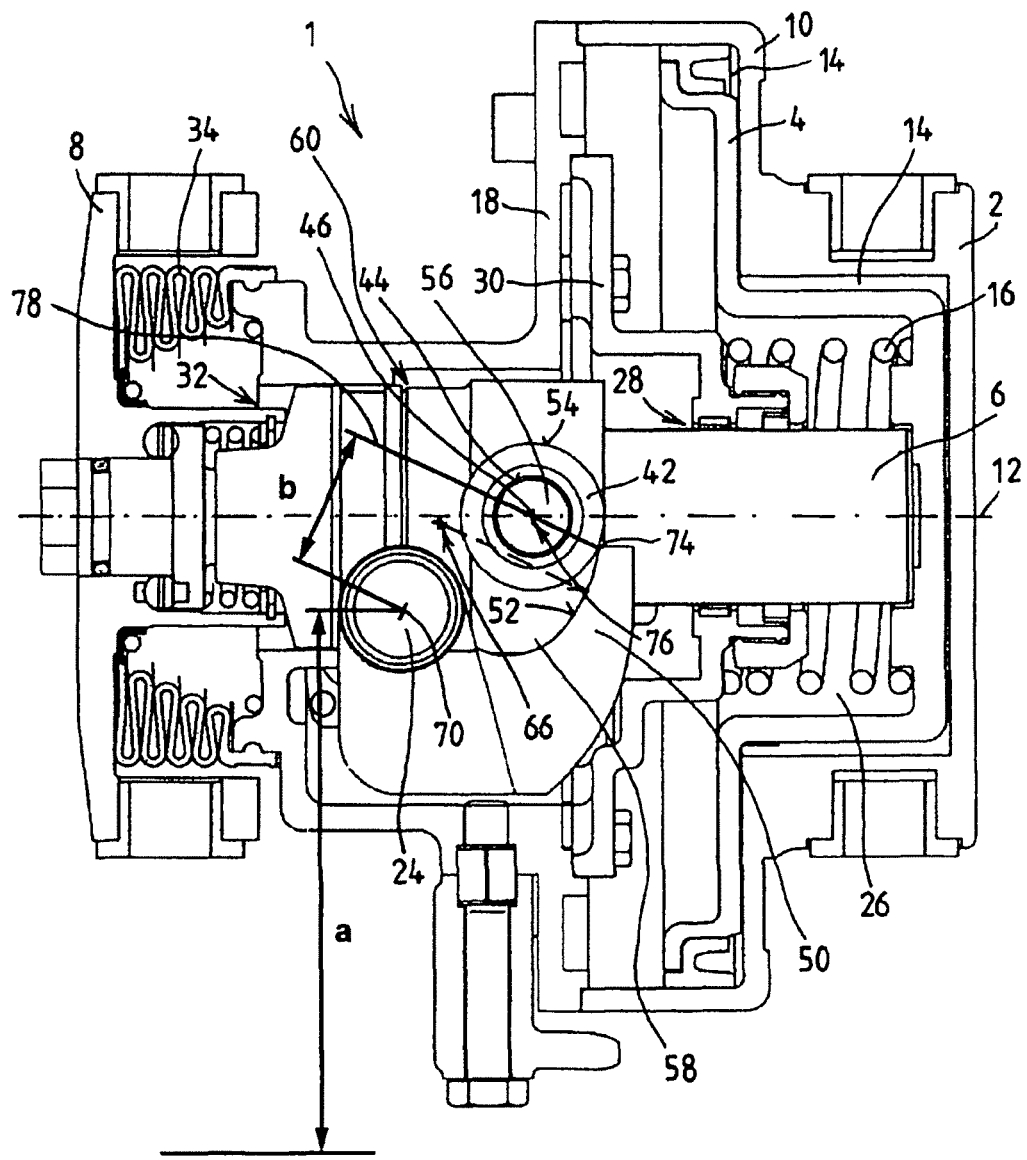
FIG. 3 shows a vertical longitudinal cross section through the combined service and parking brake cylinder of FIG. 1, showing the parking brake in the released position.
Figure 4:
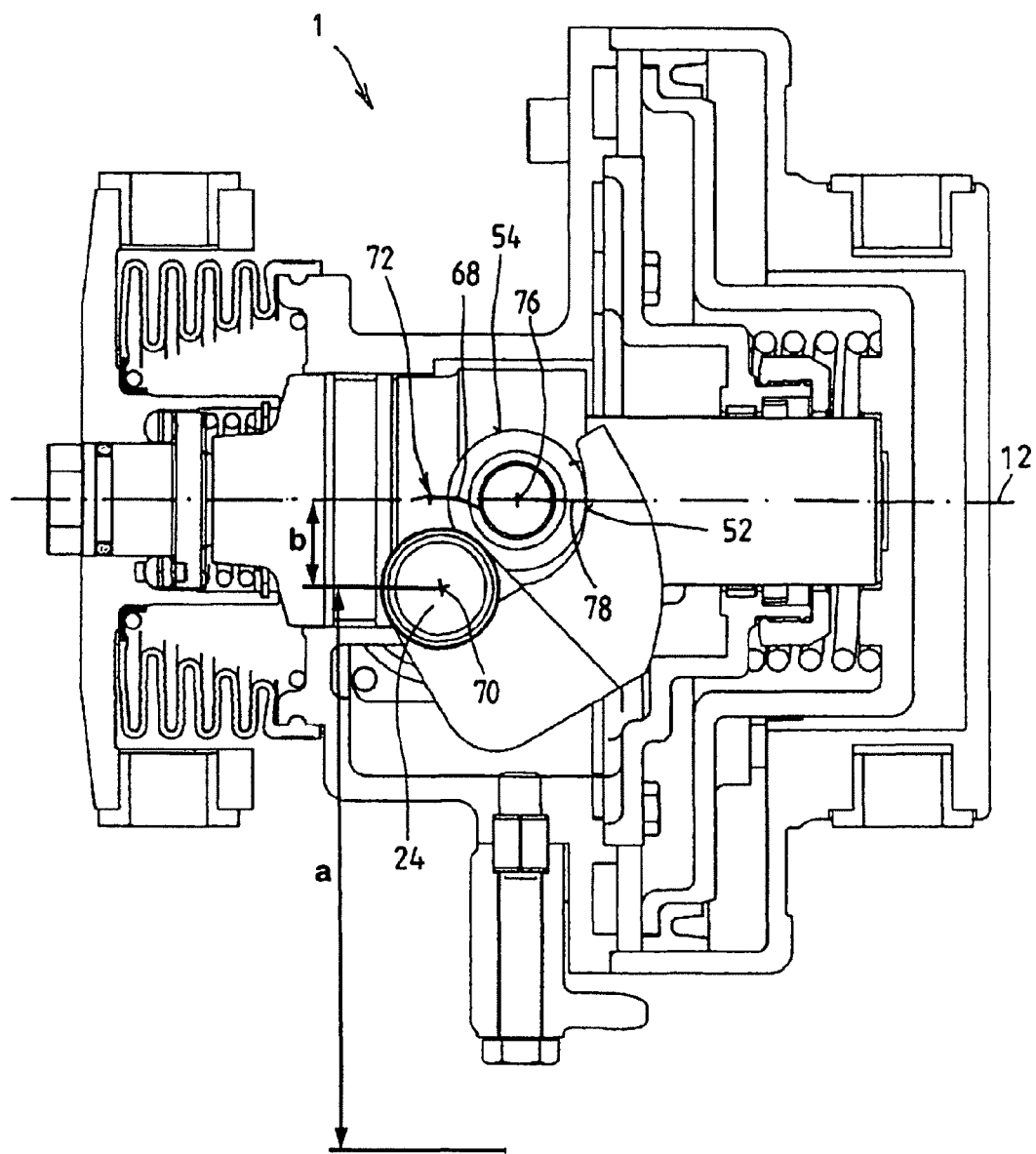
FIG. 4 shows a vertical longitudinal cross section through the combined service and parking brake cylinder of FIG. 1, showing the parking brake in the applied position.
Figure 5:
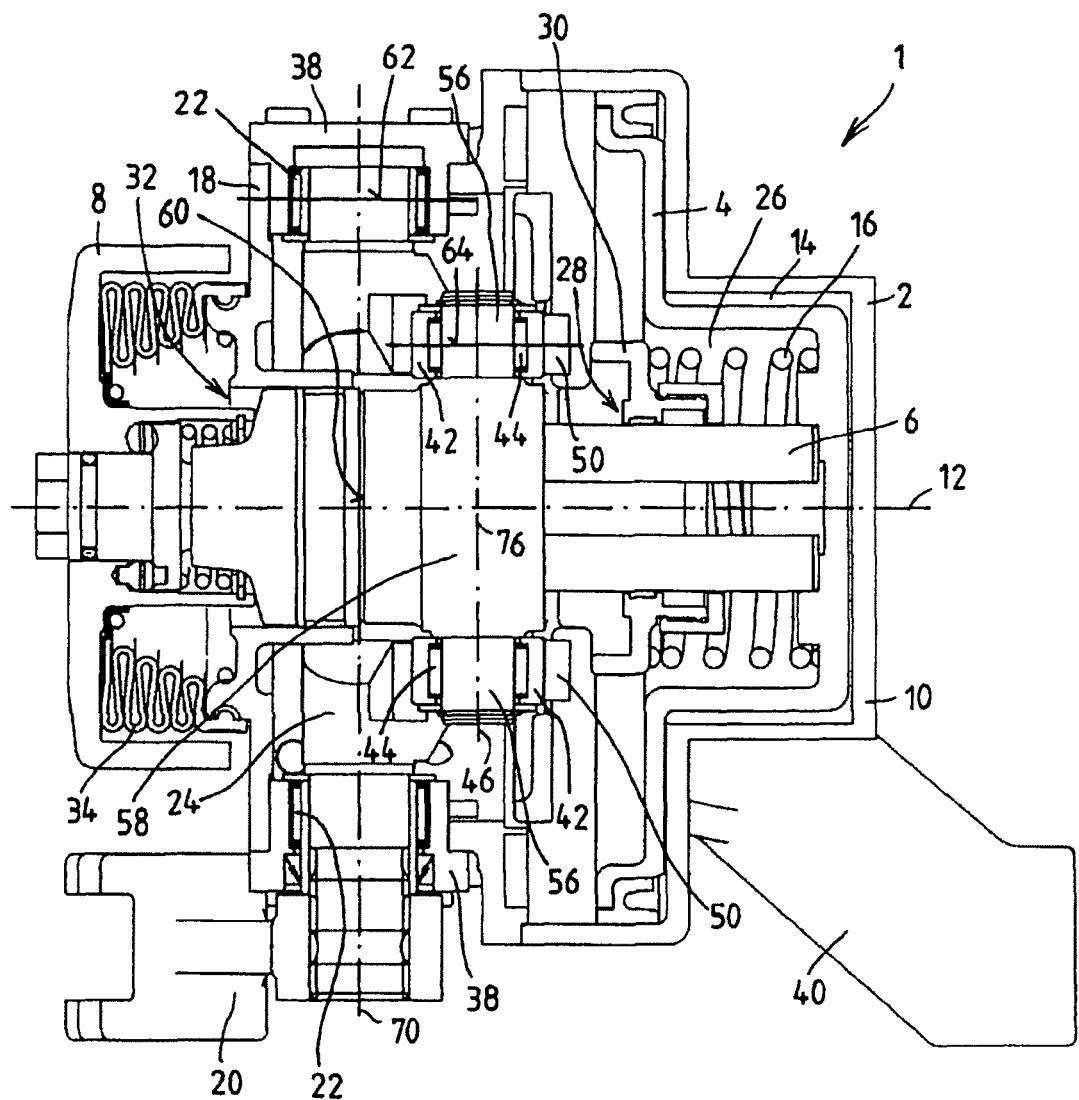
FIG. 5 shows a horizontal longitudinal cross section through the combined service brake and parking brake cylinder of FIG. 1.

To be more precise, the service brake cylinder 10 of the combined service and parking brake cylinder 1 serves as an active service brake and comprises the service brake piston 4, which is actuated by a pressurized medium and actuates the brake caliper lever via the service brake piston rod 6, which is coaxial with a brake cylinder axis 12, and the spindle yoke 8, the application and relief of pressure on the service brake piston 4 being accomplished by admitting and releasing air to and from a service brake chamber 14 within the service brake cylinder 10 (FIG. 3 to FIG. 5). A return spring 16 in the form of a compression spring preloads the service brake piston 4 into the released position shown in FIG. 3, where it is on the right.

A cylinder cover 18 axially closes off the combined service and parking brake cylinder 1 at the end at which the service brake piston rod emerges therefrom, where the end of the rod is connected to the spindle yoke 8. A sealing sleeve 34 in the form of a bellows between the cylinder cover 18 and the spindle yoke 8 seals off the through opening 32 from the outside.

The service brake piston rod 6 is guided in a through opening 28 in a dividing wall 30, which divides a spring chamber 26 from an interior space of the cylinder cover 18. Accommodated in the spring chamber 26 is the return spring 16, one end of which is supported on the dividing wall 30 and the other end of which is supported on the service brake piston 4.

The parking brake device is integrated into or formed on the combined service brake and parking brake cylinder 1. The components of the parking brake device are optionally mounted or accommodated in an interior space of the cylinder cover 18 or on the cylinder cover 18 of the combined service brake and parking brake cylinder 1. More specifically, the parking brake device has an actuating lever 20, which is pivotably mounted on the cylinder cover 18 located at the end and the rotary motion of which is transmitted to a shaft 24 arranged perpendicularly to the brake cylinder axis 12 and rotatably mounted by means of shaft bearings 22 mounted on the cylinder cover 18.

Figure 2:
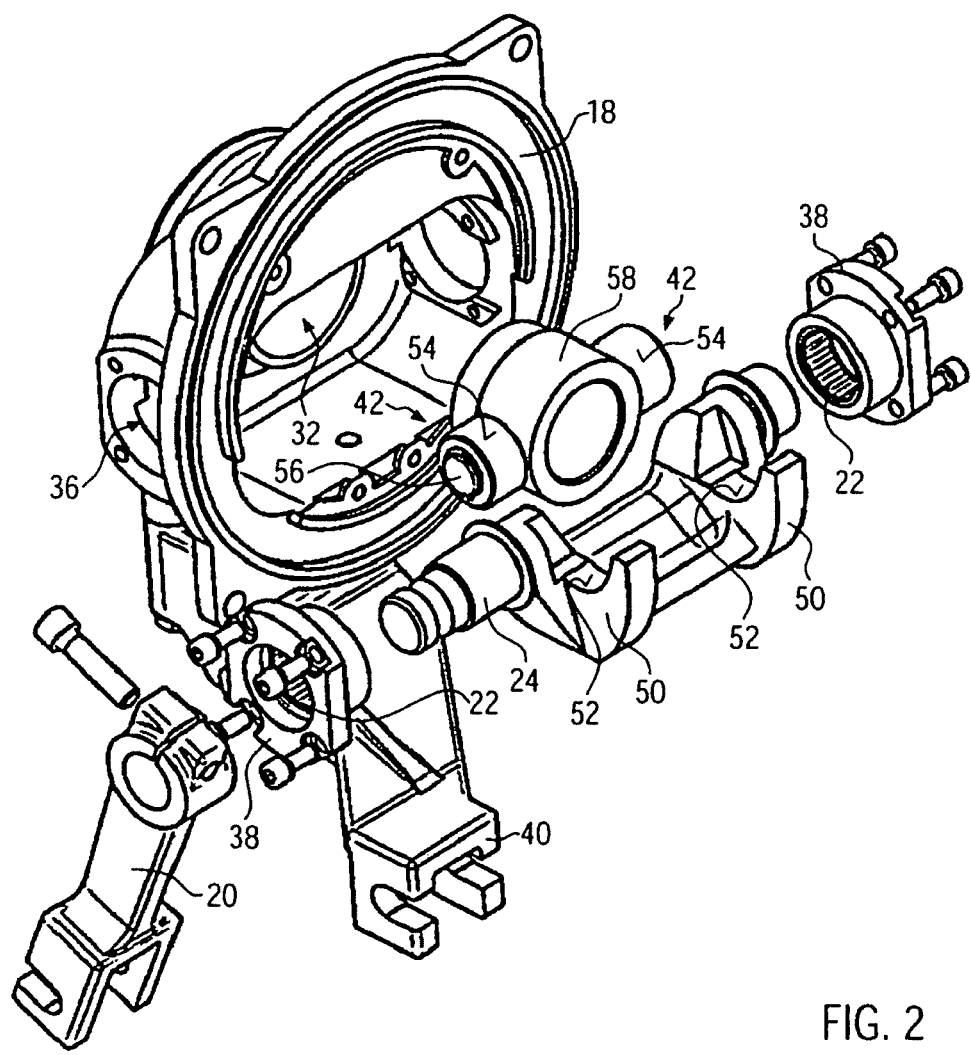
FIG. 2 shows an exploded drawing of a cylinder cover of the combined service and parking brake cylinder of FIG. 1, showing components of the parking brake device.

Two shaft bearings 22 are optionally arranged symmetrically and perpendicularly with respect to the brake cylinder axis 12 and are, for example, formed in bearing caps 38 that can be inserted from the outside into through openings 36 in the cylinder cover 18, as can be seen in FIG. 2 and FIG. 5. An abutment for a Bowden control in the form of a holding fork 40 (not shown here) which actuates the actuating lever 20 is furthermore also fixed on the cylinder cover 18, as FIG. 1 and FIG. 5 show.

The rotary motion of the actuating lever 20 induced by means of the Bowden control and hence also that of the shaft 24 connected to the lever for conjoint rotation therewith is then converted by means of a cam mechanism into a linear motion of support rollers 42 directed parallel to the brake cylinder axis 12. The support rollers 42 are rotatably mounted by means of support roller bearings 44 on a rotational axis 46 arranged parallel to the shaft 24. Cams 50 connected to the shaft 24 for conjoint rotation therewith and having effective cam surfaces 52 are furthermore provided, the cam surfaces interacting with radially outer support roller surfaces 54 of the support rollers 42 during an application or release stroke of the parking brake device, wherein the linear motion of the support rollers 42 is transmitted to the service brake piston rod 6. The cam mechanism, which converts the rotary motion of the shaft 24 induced by means of the actuating lever 20 into a linear motion of the service brake piston rod 4, will now be described in detail.

More specifically, two cams 50, which are arranged symmetrically with respect to the brake cylinder axis 12 and connected to the shaft 24 for conjoint rotation therewith, and two support rollers 42, which interact with the cams and are likewise arranged symmetrically with respect to the brake cylinder axis 12, are provided. The support rollers 42 are rotatably mounted on bearing journals 56, which are coaxial with the rotational axis 46, project perpendicularly away from a pressure ring 58 and are again aligned perpendicularly to the brake cylinder axis 12.

The pressure ring 58 is mounted on the service brake piston rod 6 in such a way that it can be moved coaxially with respect to the brake cylinder axis 12, wherein the linear motion of the pressure ring 58 can be transmitted via an axial stop 60 to the service brake piston rod 6, which then actuates the spindle yoke 8, to the left for application and to the right for release in FIG. 3 to FIG. 5. According to the embodiment in FIG. 3 to FIG. 5, the stop 60 on the pressure ring 58 is, for example, designed as a flat annular surface which is arranged perpendicularly to the brake cylinder axis 12 and, for axial force transmission, interacts with a complementary flat annular surface on the service brake piston rod 6, the latter surface likewise being arranged perpendicularly to the brake cylinder axis 12.

Figure 6:
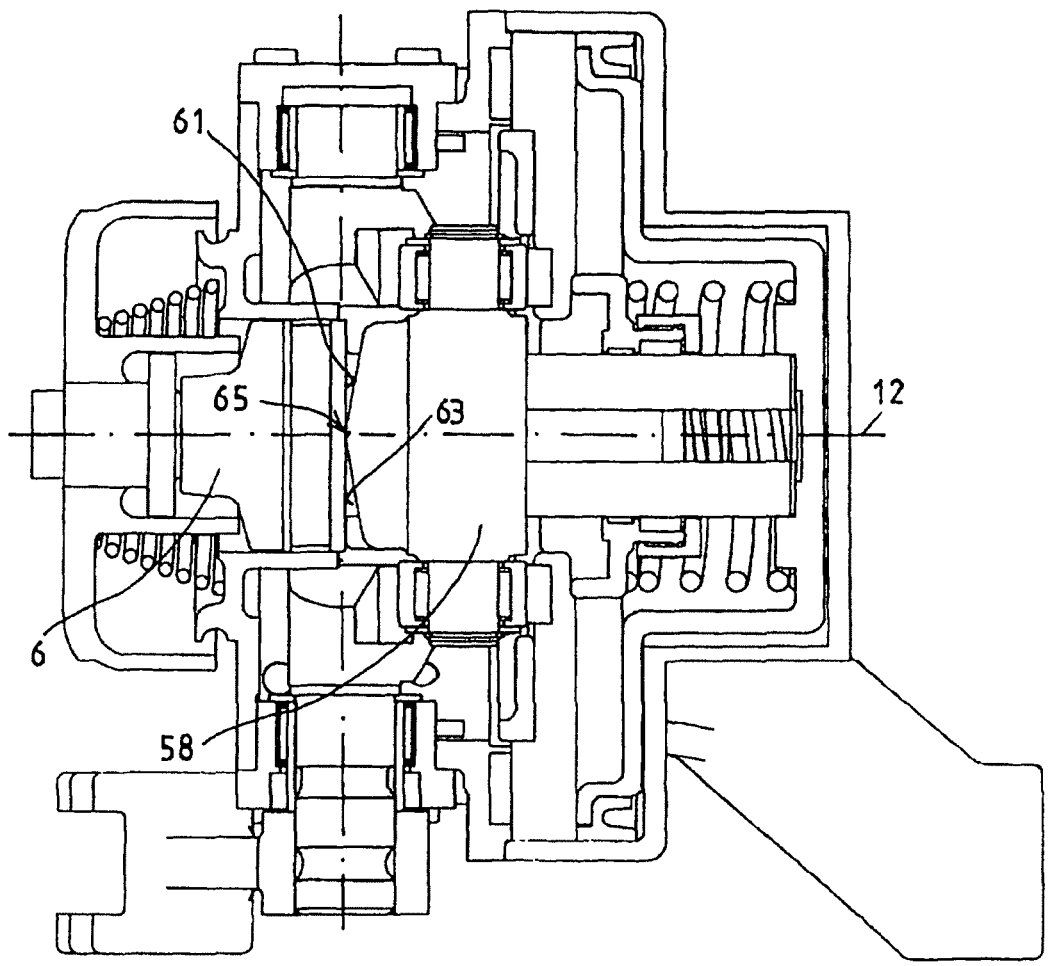
FIG. 6 shows a vertical longitudinal cross section through a combined service and parking brake cylinder in accordance with another disclosed embodiment.

The shaft 24 is deformed elastically under load, with the result that the cams 50 undergo an angular offset which leads to nonuniform loading of the support rollers 42. By virtue of the design of the stop 60 on the pressure ring 58 as a stop surface 61 which is of convexly spherical design, when viewed in the direction of the brake cylinder axis 12, and which interacts with an annular surface 63 on the service brake piston rod 6, the surface being flat and arranged perpendicularly to the brake cylinder axis 12, for example, the angular offset of the cams 50 can be compensated since the pressure ring 58, which is mounted with axial play on the service brake piston rod 6, can then tilt relative to the service brake piston rod 6 and to the brake cylinder axis 12, as shown in FIG. 6. Contact between the annular surface 63 and the stop surface 61 of convexly spherical design then takes place substantially along at least a line 65, which then forms a tilt bearing for the pressure ring 58.

The spindle yoke 8 then transmits the application motion to the corresponding brake caliper lever in order to bring about an application motion of the brake caliper, during which the brake pads enter into frictional engagement with the brake disk, thereby applying the parking brake.

When viewed in a direction perpendicular to the brake cylinder axis 12, the shaft bearings 22 and the support roller bearings 44 are arranged offset relative to one another, as can be seen particularly from FIG. 5. The shaft bearings 22 and the support roller bearings 44 are optionally designed as rolling contact bearings, in particular as roller bearings. In particular, the shaft bearings 22 and the support roller bearings 44 are arranged in different planes 62, 64, wherein surface normals to these planes 62, 64 are arranged perpendicularly to the brake cylinder axis 12 and such a plane 62, 64 essentially forms a plane of symmetry with respect to the rollers, to which they are arranged perpendicularly. In particular, the distance between the plane 62 of the shaft bearings 22 and the brake cylinder axis 12 is greater than the distance between the plane 64 of the support roller bearings 44 and the brake cylinder axis 12.

The effective cam surfaces 52 of the cams 50, which interact with the radially outer support roller surfaces 54 of the support rollers 42, are each designed as a circumferential segment of a cylindrical surface, as shown by FIG. 3 and FIG. 4, in particular. Here, the term "circumferential segment of a cylindrical surface 52" is intended to refer to an arcuate piece of an imaginary complete cylinder extending over a certain angle.

As can be seen in FIG. 3, the center axis 66 of this imaginary cylinder follows a circular path of motion 68 about the shaft axis 70 of the shaft 24 during an application or release stroke of the parking brake device. The effective cam surfaces 52 of the cams 50 and the support rollers 42 are designed and arranged in such a way that a point of intersection 72 of the path of motion 68 with the brake cylinder axis 12 exists that is associated substantially with a maximum parking brake force. This state of affairs is best illustrated by FIG. 4.

It is particularly preferred if the shaft 24 and the support rollers 42 are arranged in such a way that the distance b between a line of action of force 78 and the shaft axis 70, the line of action extending between a line of contact 74 between the effective cam surface 52 and the support roller surface 54, on the one hand, and the support roller axis 76, on the other hand, assumes a maximum value at the beginning of the application stroke (FIG. 3), relative to the total application stroke of the parking brake device from the release position shown in FIG. 3 to the applied position in FIG. 4. The larger this distance b between the line of action of force 78 and the shaft axis 70, the smaller is the transmission ratio i of the cam mechanism obtained through the interaction of the effective cam surface 52 and the support roller surface 54.

In the applied state in accordance with FIG. 4, the line of action of force 78 is coaxial with the brake cylinder axis 12, the line of action of force 78 indicating the direction of the force acting between the effective cam surface 52 and the support roller surface 54, the force having been described above.

The distance a indicated in FIG. 3 and FIG. 4 corresponds to the effective lever arm between the articulation point of the Bowden control on the actuating lever 20 and the shaft axis 70 when the actuating force is introduced into the actuating lever 20 via the Bowden control.

The transmission ratio i of the cam mechanism is then obtained from the respective distances or lever arms a and b (FIG. 3 and FIG. 4):

$$i = \frac{a}{b}$$

FIG. 3 shows the parking brake device in the released position, in which the radially outer support roller surface 54 or circumferential surface of the support rollers 42 is in engagement with the edge of the effective cam surface 52 remote from the shaft 24. The lever arm b is then at a maximum. In contrast, FIG. 4 shows the parking brake device in the applied position, in which the lever arm b is at a minimum.

In other words, the transmission ratio i is smallest at the beginning of the application stroke or in the release position, when only the release clearance between the brake pads and the associated friction partner has to be crossed and the lever arm b is at a maximum. The transmission ratio i then increases as the application stroke progresses, inter alia because the lever arm or distance b between the line of action of force 78 and the shaft axis 70 decreases. The multiplication of force by the cam mechanism formed by the cams 50 and the support rollers 42 therefore increases as the application stroke progresses. Accordingly, there is a relatively small application force at the beginning of the application stroke, when only the release clearance has to be crossed, and a high application force toward the end of the application stroke, when the maximum parking brake force is supposed to act.

List Of Reference Signs 1 combined service and parking brake cylinder
2 housing
4 service brake piston
6 service brake piston rod
8 spindle yoke
10 service brake cylinder
12 brake cylinder axis
14 service brake chamber
16 return spring
18 cylinder cover
20 actuating lever
22 shaft bearing
24 shaft
26 spring chamber
28 through opening
30 dividing wall
32 through opening
34 sealing sleeve
36 through openings
38 bearing cap
40 holding fork
42 support rollers
44 support roller bearing
46 rotational axis
50 cam
52 effective cam surfaces
54 support roller surfaces
56 bearing journal
58 pressure ring
60 stop
61 stop surface
62 plane
63 annular surface
64 plane
65 line
66 center axis
68 path of motion
70 shaft axis
72 point of intersection
74 line of contact
76 support roller axis
78 line of action of force

The invention claimed is:

1. A brake device for a railway vehicle, comprising:
at least one service brake cylinder having at least one service brake piston actuated by a pressurized medium, said piston actuating a service brake piston rod coaxial with a brake cylinder axis; and
a pivotably mounted actuating lever, the rotary motion of which being transmitted to a shaft arranged perpendicularly to the brake cylinder axis and rotatably mounted on a housing by at least one shaft bearing,
wherein the rotary motion of the shaft induced by the actuating lever is converted to a linear motion, directed parallel to the brake cylinder axis, of at least one support roller rotatably mounted, by a support roller bearing, on a rotational axis arranged parallel to the shaft as a result of at least one cam connected to the shaft for conjoint rotation therewith and provision of an effective cam surface interacting with a radially outer support roller surface of the support roller during an application or release stroke of the parking brake device,
wherein the linear motion of the support roller is transmitted to the service brake piston rod,
wherein the effective cam surface is designed as a circumferential segment of a cylindrical surface, a center axis of the cylindrical surface following a circular path of motion about a shaft axis during an application or release stroke of the parking brake device, wherein a transmission ratio is smallest at the beginning of an application stroke,
wherein a point of intersection of said path of motion with the brake cylinder axis exists that is associated with a maximum parking brake force,
wherein the at least one cam is one of two cams, which are arranged symmetrically with respect to the brake cylinder axis are connected to the shaft for conjoint rotation therewith and constitute involute contoured cams,
wherein the at least one support roller is one of two support rollers, wherein the two involute contoured cams each have an involute contour arranged on the shaft and are in engagement on both sides of a piston rod tube and interact with the two support rollers mounted on the piston rod tube, wherein the two support rollers are arranged symmetrically with respect to the brake cylinder axis, and
wherein the two cams and the two support rollers are rotatable about a common rotational axis.

2. The brake device of claim 1, wherein a distance (b) between a line of action of force and the shaft axis, said line of action extending between a line of contact between the effective cam surface and the support roller surface, on the one hand, and the support roller axis, on the other hand, assumes a maximum value at the beginning of the application stroke, relative to the total application stroke.

3. The brake device of claim 1, wherein at least two shaft bearings arranged symmetrically with respect to the brake cylinder axis are provided, and the shaft bearings and the support roller bearings are arranged offset with respect to one another, when viewed in a direction perpendicular to the brake cylinder axis.

4. The brake device of claim 3, wherein the distance between the shaft bearings and the brake cylinder axis is greater than the distance between the support roller bearings and the brake cylinder axis.

5. The brake device of claim 1, wherein the at least one support roller is rotatably mounted by a bearing journal on a pressure ring mounted on the service brake piston rod such that the at least one support roller can be moved coaxially with respect to the brake cylinder axis, wherein the linear motion of the pressure ring is transmitted via an axial stop to the service brake piston rod.

6. The brake device as claimed in claim 5, wherein the pressure ring is mounted on the service brake piston rod in such a way that it can be moved coaxially with respect to the brake cylinder axis, and the stop is designed as a stop surface which is of convexly spherical design, when viewed in the direction of the brake cylinder axis, and interacts with an annular surface arranged perpendicularly to the brake cylinder axis, wherein the stop surface of convexly spherical design and the annular surface arranged perpendicularly to the brake cylinder axis are each formed either on the pressure ring or on the service brake piston rod.

7. The brake device of claim 1, wherein the service brake piston rod actuates a brake mechanism.

8. The brake device of claim 1, wherein the housing supporting the at least one shaft bearing is designed as a cylinder cover, which axially closes off a spring chamber of the service brake cylinder, in which a return spring supported at one end on the cylinder cover and at the other end on the service brake piston is accommodated.

9. The brake device of claim 8, wherein a bearing for a Bowden control used to actuate the actuating lever is formed on the cylinder cover.

10. The brake device of claim 8, wherein the at least one shaft bearing is formed in a bearing cap, which can be inserted from the outside into a through opening in the cylinder cover.

11. The brake device of claim 1, wherein the at least one shaft bearing and the at least one support roller bearing are designed as rolling contact bearings.

12. The brake device of claim 1, wherein the brake device is designed as a brake caliper unit of a disk brake of a railway vehicle.

* * * * *